(12) United States Patent
Hobby et al.

(10) Patent No.: US 10,826,781 B2
(45) Date of Patent: Nov. 3, 2020

(54) SYSTEMS AND METHODS FOR EXTRACTING STRUCTURE FROM LARGE, DENSE, AND NOISY NETWORKS

(71) Applicant: Elsevier, Inc., New York, NY (US)

(72) Inventors: Matt Hobby, York (GB); Barry Norton, Kobenhaven (DK); Jacek Szejda, Warsaw (PL); Peter Wooldridge, London (GB)

(73) Assignee: ELSEVIER, INC., New York, NY (US)

( * ) Notice: Subject to any disclaimer, the term of this patent is extended or adjusted under 35 U.S.C. 154(b) by 141 days.

(21) Appl. No.: 16/050,138

(22) Filed: Jul. 31, 2018

(65) Prior Publication Data
US 2019/0044821 A1 Feb. 7, 2019

Related U.S. Application Data

(60) Provisional application No. 62/539,758, filed on Aug. 1, 2017.

(51) Int. Cl.
  *H04L 12/24* (2006.01)
(52) U.S. Cl.
  CPC .................................. *H04L 41/12* (2013.01)
(58) Field of Classification Search
  None
  See application file for complete search history.

(56) References Cited

U.S. PATENT DOCUMENTS

| 5,832,182 A | 11/1998 | Zhang et al. |
| 6,003,029 A | 12/1999 | Agrawal et al. |

(Continued)

FOREIGN PATENT DOCUMENTS

| CN | 104346481 | 2/2015 |
| CN | 105930856 | 9/2016 |

OTHER PUBLICATIONS

Ester, Martin; Kriegel, Hans-Peter; Sander, Jorg; Xu, Xiaowei, "Density-Based Algorithm for Discovering Clusters in Large Spatial Databases with Noise," https://www.aaai.org/Papers/KDD/1996/KDD96-037.pdf, 1996.

(Continued)

*Primary Examiner* — Alex Skripnikov
*Assistant Examiner* — Sharmin Chowdhury
(74) *Attorney, Agent, or Firm* — Dinsmore & Shohl LLP

(57) ABSTRACT

A method for extracting structure from networks includes receiving an edge list, where the edge list defines a network including nodes and edges connecting the nodes to each other, where the edges define a strength of a relationship between connected nodes and filtering nodes from the edge list based on a predetermined filter parameter, thereby forming a filtered network. The method further includes identifying distinct connected components within the filtered network, analyzing each of the distinct connected components of the filtered network for the presence of additional structures within the distinct connected components, where the additional structures are decomposed into additional distinct connected components. The method further includes performing a tree traversal of each of the distinct connected components, where a resulting hierarchical structure from the tree traversal is merged to determine a local modularity optimum and generating, in response to the local modularity optimum, structural components within the network.

17 Claims, 7 Drawing Sheets

(56) References Cited

U.S. PATENT DOCUMENTS

| | | | |
|---|---|---|---|
| 6,092,072 | A | 7/2000 | Guha et al. |
| 9,110,985 | B2 | 8/2015 | Boscolo et al. |
| 2012/0284384 | A1 | 11/2012 | Shi et al. |
| 2015/0302062 | A1* | 10/2015 | Cheng ............... G06F 16/2465 707/734 |
| 2016/0171732 | A1 | 6/2016 | Glover |

OTHER PUBLICATIONS

De Meo, Pasquale; Ferrara, Emilio; Fiumara, Giacomo; Provetti, Alessandro, "Generalized Louvain method for community detection in large networks," Feb. 10, 2012, arXiv:1108.1502.

Newman, M.E.J., "Modularity and community structure in networks," www.pnas.org.cgi/doi/0.1073/pnas.0601602103, Feb. 26, 2006.

Leskovec, Jure; Lang, Kevin, J.; Dasqupta, Anirban; Mahoney, Michael W., "Statistical Properties of Community Structure in Large Social and Information Networks," 2008, Beijing, China.

Fruchterman, Thomas M.J.; Reingold, Edward M., "Graph Drawing by Force-directed Placement," Software: Practice and experience, Nov. 1991, vol. 21(1 1), 1129-1164.

Martin, Shawn; Brown, W. Michael; Klavans, Richard; Boyack, Kevin W., "OpenOrd: An Open-Source Toolbox for Large Graph Layout," IS&T/SPIE Electronic Imaging: International Society for Optics and Photonics, 2011.

International Search Report and Written Opinion of the International Searching Authority, dated Nov. 5, 2018, issued in PCT/US2018/044824.

Schulz, Christian, "Graph Partitioning and Graph Clustering in Theory and Practice", Institute for Theoretical Informatics, Karlsruhe Institute of Technology (KIT), May 20, 2016.

Ovelgonne, Michael, "Scalable Algorithms for Community Detection in Very Large Graphs," Institute for Information Management and Management (IISM), Karlshruhe, Faculty of Economics (WIWI), Jul. 14, 2011.

Nawaz, Waqas, et al., "Traversal Optimizations and Analysis for Large Graph Clustering," 2015 31st IEEE International Conference on Data Engineering Workshops, Jun. 22, 2015.

* cited by examiner

SYSTEMS AND METHODS FOR EXTRACTING STRUCTURE FROM LARGE, DENSE, AND NOISY NETWORKS

CROSS REFERENCE TO RELATED APPLICATIONS

This application claims the benefit of U.S. Provisional Application No. 62/539,758, filed Aug. 1, 2017, the contents of which are hereby incorporated by reference in its entirety.

TECHNICAL FIELD

The present specification generally relates to systems and methods for extracting structure from networks and, more specifically, to systems and methods for extracting structure from large, dense, and noisy network models utilizing a combination of filtering and analysis methods employed in an iterative process.

BACKGROUND

Many systems of scientific interest can be represented as networks, sets of nodes joined by edges. Examples include the internet and the worldwide web, metabolic networks, food webs, neural networks, communication and distribution networks, social networks, and large data sets for data analytics. That is, network models can describe entities and how they are connected. However, there is a problem with detecting and characterizing community structures within these large and usually noisy network models. In general, the problem is that relationships that define underlying network structure can be masked by relationships that do not define structure, (e.g., the so-called "noise" within the network model). Existing methods do not resolve noisy relationships and therefore often do not resolve underlying structure throughout a network model.

SUMMARY

In one embodiment, a method for extracting structure from networks, includes receiving, by a processor, an edge list, where the edge list defines a network including a plurality of nodes and one or more edges connecting one or more nodes of the plurality of nodes to each other, where the one or more edges define a strength of a relationship between connected nodes and filtering, by a processor, one or more nodes from the edge list based on a predetermined filter parameter, thereby forming a filtered network. The method further includes identifying one or more distinct connected components within the filtered network utilizing Dijkstra's algorithm, analyzing each of the one or more distinct connected components of the filtered network for the presence of additional structures within the one or more distinct connected components, where the additional structures are decomposed into additional distinct connected components, performing a tree traversal of each of the distinct connected components, where a resulting hierarchical structure from the tree traversal is merged to determine a local modularity optimum, and generating, in response to the local modularity optimum, one or more structural components within the network.

In another embodiment, a system for extracting structure from networks including a processor, and a non-transitory, processor-readable memory coupled to the processor, the non-transitory, processor-readable memory comprising a machine readable instruction set stored thereon. The machine readable instruction set, when executed by the processor, causes the processor to: receive an edge list, where the edge list defines a network including a plurality of nodes and one or more edges connecting one or more nodes of the plurality of nodes to each other, where the one or more edges define a strength of a relationship between connected nodes, and filter out one or more nodes from the edge list based on a predetermined filter parameter, thereby forming a filtered network. The machine readable instruction set may further cause the processor to identify one or more distinct connected components within the filtered network utilizing Dijkstra's algorithm, analyze each of the one or more distinct connected components of the filtered network for the presence of additional structures within the one or more distinct connected components, where the additional structures are decomposed into additional distinct connected components, perform a tree traversal of each of the distinct connected components, where a resulting hierarchical structure from the tree traversal is merged to determine a local modularity optimum, and generate, in response to the local modularity optimum, one or more structural components within the network.

In yet another embodiment, a computer program product for extracting structure from networks, which when executed by a computer, cause the computer to carry out steps including: receiving an edge list, where the edge list defines a network including a plurality of nodes and one or more edges connecting one or more nodes of the plurality of nodes to each other, where the one or more edges define a strength of a relationship between connected nodes, filtering out one or more nodes from the edge list based on a predetermined filter parameter, thereby forming a filtered network, and identifying one or more distinct connected components within the filtered network utilizing Dijkstra's algorithm. The computer program product may further cause the computer to carry out steps including: analyzing each of the one or more distinct connected components of the filtered network for the presence of additional structures within the one or more distinct connected components, where the additional structures are decomposed into additional distinct connected components, performing a tree traversal of each of the distinct connected components where a resulting hierarchical structure from the tree traversal is merged to determine a local modularity optimum, and generating, in response to the local modularity optimum, one or more structural components within the network.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
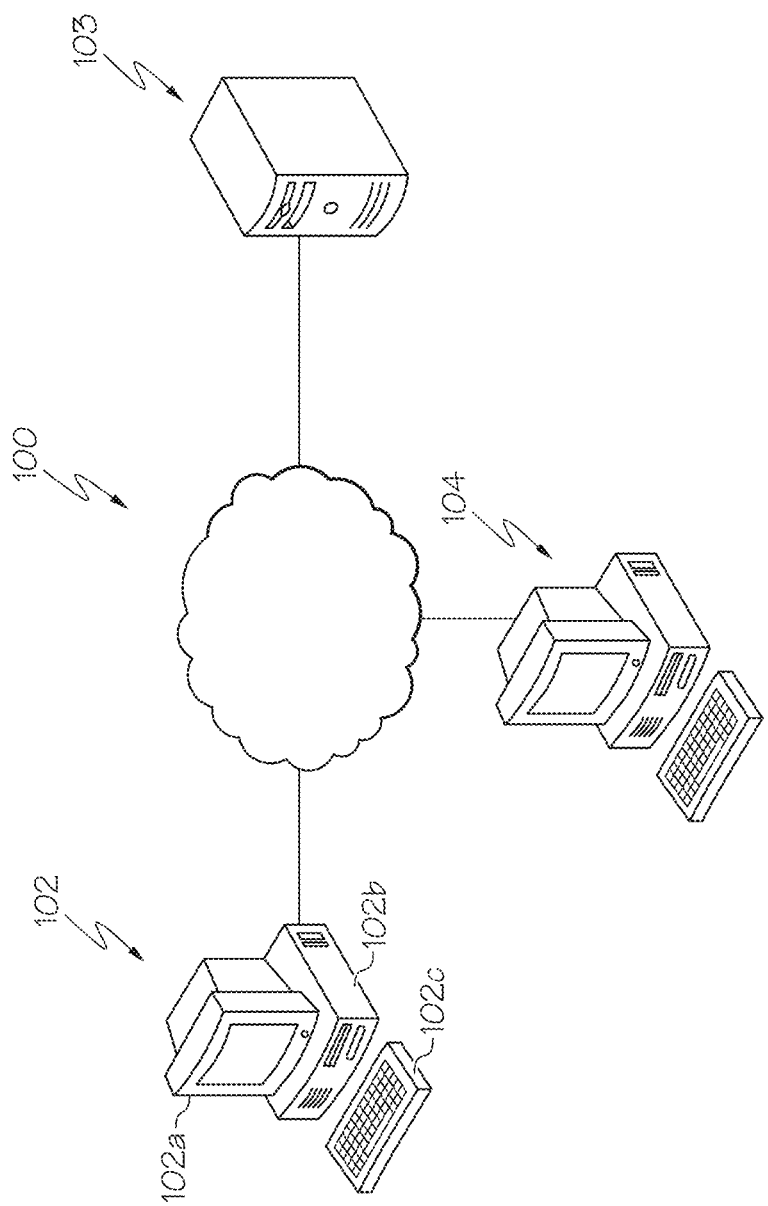
FIG. 1 schematically depicts an example computing network for extracting structure from large, dense, and noisy network models, according to one or more embodiments shown and described herein.

Network models describe entities and how they are connected. As a non-limiting example, network models may be used to describe relationships between written articles and the citations between them, or authors and the co-authorship links between publications. For example, there may be tens of millions of articles and authors with billions of relationships, thus providing a significantly large network. As a non-limiting example, publications may have one or more attributes that define the publication, such as authorship, internal citations, mediums of publication, subject matter, publication and revision dates, or the like. Each of these attributes and others for one publication may be linked together with many other publications, which may form a network model of publications. Communities, or structural components as also referred to herein, may form and exist as publications are added or removed from the network model. Determining such communities may provide a system (such as a cataloging or searching system) or user with unique sets of communities (i.e., groups of networked publications) that may be determined from the underlying structures determined by the systems and methods described herein.

Within such network models, dense groups of relationships may be observed that represent the underlying structure in the network model. In the article example presented above, these relationships may represent a common topic area of articles, or a community of authors. Extracting this structure across such a large network may be challenging and a number of algorithms exist for identifying these groups. In many cases, the relationships that define the underlying network structure can be masked by relationships that do not define structure—so called "noisy" edges. It may be impossible to know apriori, which relationships are structural and which are noise for many reasons, which may include, but is not limited to, the large volume of nodes (e.g., publications) within the network model, which may represent a publication. For example, a first publication and a second publication within a network model may be linked together because they share a co-author, but that link may be a "noisy" link because the co-author linking the first and second publication may primarily author or contribute more substantially to publications having subject matter discussed in the second publication rather than subject matter discussed in the first publication. As such, in some cases communities based on subject matter may include "noisy" members because of link (or "edge" as referred to herein) that is less significant, although relevant to the relationship between the first and second publications.

Some methods for extracting structure in a network do not resolve noisy relationships, and therefore often do not resolve underlying structure throughout a network model. Embodiments of the present disclosure are directed to systems and methods that, for extracting structure in large, dense and noisy network models, resolve underlying structure using an iterative approach that resolves noisy relationships.

As described herein, the systems and methods extract structure from large, dense, and noisy network models, which results in defining communities, which are also referred to herein as structural components within the network model. These structural components may be stored as reattached networks within the data storage component. Furthermore, these communities may be utilized by other applications and methods for analyzing data, such as big data sets to determine relationships, trends, or the like from the data. These communities may be utilized by additional computing devices and systems to build a knowledge base or identify relationships between data, which may improve results returned from search algorithms and/or offer suggestions for further related content to a user through predicative algorithms that are based on the community of relationships uncovered by the systems and methods described herein.

Various embodiments for extracting structure from large, dense, and noisy network models are now described hereinbelow.

Referring now to the drawings, FIG. 1 depicts an exemplary computer network 100, illustrating components for a system that extracts structure from large, dense, and noisy network models, according to one or more embodiments shown and described herein. As illustrated in FIG. 1, a network 100 may include a wide area network, such as the internet, a local area network (LAN), a mobile communications network, a public service telephone network (PSTN) and/or other network and may be configured to electronically and/or communicatively connect a user computing device 102, a extraction computer 103 for extracting structure from large, dense, and noisy network models, and an administrator computing device 104.

The user computing device 102 may include a display 102a, a processing unit 102b and an input device 102c, each of which may be communicatively coupled together and/or to the network 100. The user computing device 102 may be used to interface with a front-end application, which may utilize the system and method for extracting structure from large, dense, and noisy network models. In some embodiments, one or more user computing devices may be implemented to extract structure from large, dense, and/or noisy network models by carrying out one or more specific steps described herein.

Additionally, included in FIG. 1 is the administrator computing device 104. In the event that the extraction computer 103 for extracting structure from large, dense, and noisy network models requires oversight, updating, or correction, the administrator computing device 104 may be configured to provide the desired oversight, updating, and/or correction.

It should be understood that while the user computing device 102 and the administrator computing device 104 are depicted as personal computers and the extraction computer 103 for generating content summaries is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user computing device 102, the extraction computer 103 for extracting structure from large, dense, and noisy network models, and administrator computing device 104 may represent a plurality of computers, servers, databases, and the like. For example, each of the user computing device 102, the extraction computer 103 for extracting structure from large, dense, and noisy network models, and administrator computing device 104 may form a distributed or grid-computing framework for implementing the methods described herein.

Figure 2:
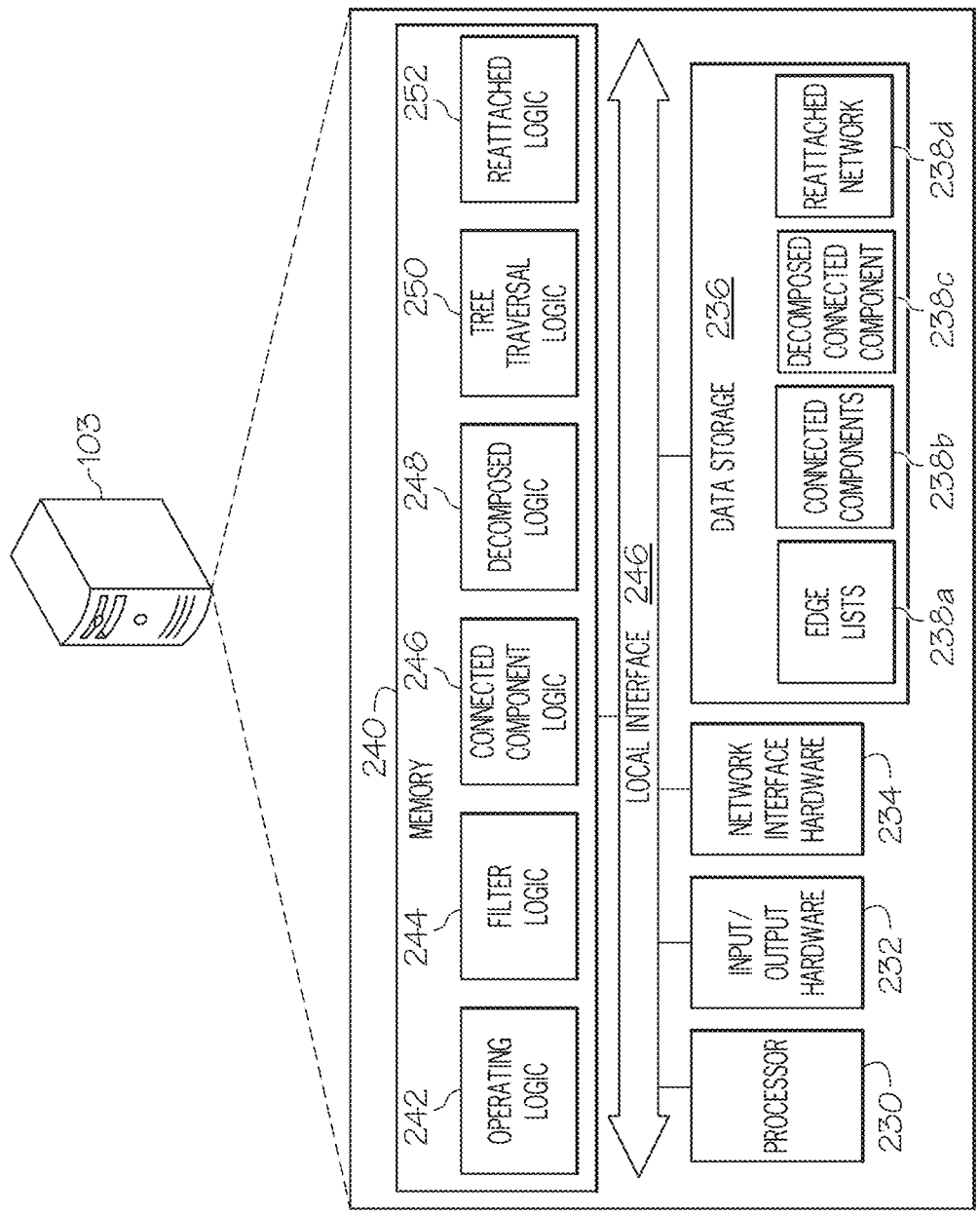
FIG. 2 schematically depicts an example computing device that extracts structure from large, dense, and noisy network models, according to one or more embodiments shown and described herein.

FIG. 2 depicts internal components of the extraction computer 103 for extracting structure from large, dense, and noisy network models. The extraction computer 103 generally filters, identifies, analyzes, and generates one or more structural components from within the network model as described herein. To complete such tasks, the extraction computer 103 for extracting structure from large, dense, and noisy network models may utilize hardware, software, and/or firmware, according to embodiments shown and described herein. While in some embodiments, the extraction computer 103 may be configured as a general-purpose computer with the requisite hardware, software, and/or firmware, in some embodiments, the extraction computer 103 may be configured as a special purpose computer designed specifically for performing the functionality described herein. In embodiments where the extraction computer 103 is a general purpose computer, it should be understood that the process completed by the extraction computer 103 as described herein improve computer functionality by allowing more efficient access to a large, dense, and noisy network model.

As also illustrated in FIG. 2, the extraction computer 103 may include a processor 230, input/output hardware 232, network interface hardware 234, a data storage component 236, which stores edge lists 238a, connected components data 238b, decomposed connected components data 238c, and resulting structural components, for example, in the form of reattached networks 238d, and a memory 240. The memory 240 may be machine readable memory (which may also be referred to as a non-transitory processor readable memory). The memory 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory 240 may be configured to store operating logic 242, filter logic 244, connected component logic 246, decomposed logic 248, tree traversal logic 250 and reattached logic 252, each of which may be embodied as a computer program, firmware, or hardware, as an example, and will be described in more detail herein. A local interface 246 is also included in FIG. 2 and may be implemented as a bus or other interface to facilitate communication among the components of the extraction computer 103.

The processor 230 may include any processing component(s) configured to receive and execute programming instructions (such as from the data storage component 236 and/or the memory 240). The instructions may be in the form of a machine readable instruction set stored in the data storage component 236 and/or the memory 240 (e.g., one or more programming instructions). The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with other networks and/or devices.

It should be understood that the data storage component 236 may reside local to and/or remote from the extraction computer 103 and may be configured to store one or more pieces of data for access by the extraction computer 103 and/or other components. As illustrated in FIG. 2, the data storage component 236 stores, for example, edge lists 238a. The edge lists 238a may be numerical representations of a network model. For example, the edge list 238a may be a large, dense, and usually noisy network model. Edge lists 238a describe the set of neighbors of a node in a network graph. In other words, an edge list defines a network that includes a plurality of nodes and edges connecting the one or more nodes of the plurality of nodes to each other. The one or more edges may further define the strength of a relationship between connected nodes by, for example, a weighted value associated with the edge or the length of the edge defining a distance between the nodes in a graph space. For example, an edge with a long length may indicate a weak relationship whereas an edge with a shorter length may indicate a stronger relationship than the longer length edge. In some embodiments, a network may be defined by an adjacency matrix, adjacency list, or other numerical/matrix structure.

The data storage component 236 may also store connected components data 238b. The connected components data 238b may contain information pertaining to a representation of a network as portions connected nodes, which have been generated by an initial filtering operation as described in more detail herein. Additionally, the decomposed connected components data 238c may include portions of a network model which are defined from connected components data 238b after being analyzed using a modularity spectral decomposition method and/or a Louvain method, for example. That is, the decomposed connected components data 238c defines additional structure within the one or more connected components 238b. The portions of the network model may correspond to, for example and without limitation, sets of web pages on related topics from a network model of the worldwide web, social units or communities from a network model of social networks, case law on particular issues or topics from a network model case law having relationships based on jurisdiction, time, cross-citation or the like. These portions, as described in more detail herein, may include even further structure, which may be refined through additional iterations of the method.

The data storage component 236 may also include data pertaining to reattached networks 238d, which define the one or more structural components, extracted from the network. The reattached networks 238d may be represented by edge lists, adjacency matrices, or other numerical representations of a network model. The reattached networks 238d may include one or more structural components determined from the large, dense, and noisy network model that define one or more individual community structures present within the network. For example, a community may be a cluster of related nodes, such as a group of articles sharing one or more authors between them, or any other attributes desired to be determined from a large collection of data.

Included in the memory 240 is the operating logic 242, filter logic 244, connected component logic 246, decomposed logic 248, tree traversal logic 250, and/or reattached logic 252. The operating logic 242 may include an operating system and/or other software for managing components of the extraction computer 103. The filter logic 244 may also be stored in the memory 240 and may contain instruction for filtering one or more nodes from the edge list based on a predetermined filter parameter, thereby forming a filtered network. For example, the predetermined filter parameter may be a predetermined value defining the number of connections for a node (i.e., the number of edge connected to the node), which may also be referred to as the node degree. Each node within the network may have at least one connection to another node. The network is filtered by the predetermined filter parameter to remove nodes and/or edges. In one non-limiting example, the predetermined filter parameter is the node degree, that is, the total number of edges from that node to all other nodes within the network. In this non-limiting example, nodes that are not well-connected and having fewer than a predetermined number of connections (e.g., fewer than 1, 2, 3, 4, 5, 6, 7, 8, 9, 10 or more connections as a non-limiting example) are filtered out of the network. The predetermined filter parameter may be kept to a minimum in the first iteration and adjusted (e.g., increased or decreased) in subsequent iterations. Removing nodes in this way decreases both nodes and edges indicative of structure and noise. That is, by removing nodes with fewer than the predetermined filter parameter, the overall number of nodes within the network model are reduced, thereby possibly exposing an initial set of structures within the network model or at least reducing an initial set of noise and some minor structural elements so that later processes may better define the underlying structures of the network model.

The memory 240 may also include connected component logic 246. The connected component logic 246 may one or more algorithms that are used to identify one or more distinct connected components within the filtered network, such as, for example Dijkstra's algorithm. For example, Dijkstra's algorithm may generate a plurality of distinct connected components defining the shortest-path between a first node and a second node within the network. For a given node, Dijkstra's algorithm may determine the shortest-path to the numerous other node for which the given node is connected to. Each of these may be combined to define a connected component. The connected component may include a collection of communities to further be defined.

In general, embodiments of Dijkstra's algorithm may parse a network model to define the shortest-path between a first node and a second node within the network, thereby generating paths and/or trees starting from an initial node to one or more other nodes within the network model. For example, Dijkstra's algorithm may include the following general steps. First, all the nodes within the network model are marked as unvisited, for example, a list of all the unvisited nodes may be formed, called the unvisited set. Second, all of the nodes may be assigned an initial, tentative distance. The initial node may be assigned a value of zero and all of the other nodes may be set to infinity. Third, starting with the initial node (i.e., in the first iteration it is the current node) the algorithm calculates the tentative distance from the current node to each of its neighboring nodes. The tentative distance is added to the value of the current node and compared to the currently assigned value determined for each of the neighboring nodes. The smaller of the two values (i.e., the tentative distance or the current value of the neighboring node, which is likely infinity if the node has not been compared before) will be assigned to the neighboring node. For example, if the current node A is marked with a distance of 6, and the edge connecting it with a neighbor B has length 2, then the distance to B through A will be 6+2=8. If B was previously marked with a distance greater than 8 then change it to 8. Otherwise, keep the current value. Fourth, the current node is marked as visited and removed from the unvisited set. A visited node will never be checked again. Fifth, if the destination node has been marked visited (i.e., when planning a route between two specific nodes) or if the smallest tentative distance among the nodes in the unvisited set is infinity (when planning a complete traversal; occurs when there is no connection between the initial node and remaining unvisited nodes), then the algorithm stops. Otherwise, the unvisited node that is marked with the smallest tentative distance from the set of neighboring nodes of the current node is selected and set as the new "current node." The algorithm then returns to the third step and continues.

Still referring to the memory 240, decomposed logic 248 may be stored within the memory 240. The decomposed logic 248 generally includes one or more methods that to determine the presence of additional structures within the connected components. For example, the decomposed logic 248 may include or otherwise implement, in full or in part, a modularity spectral decomposition method, for example, as described in the Newman paper "Modularity and community structure in networks," available at http://www.pnas.org/content/pnas/103/23/8577.full.pdf, which is hereby incorporated by reference in its entirety. Furthermore, it should be understood that other methods may be used instead of the modularity spectral decomposition methods, for example, without limitation, the Louvain method described in De Meo, Pasquale, et al. "Generalized Louvain Method for Community Detection in Large Network," *Intelligent Systems Design and Applications (ISDA)*, 2011 $11^{th}$ *International Conference on Intelligent Systems Design And Applications*, IEEE pp. 88-93, 2011. Furthermore, other methods capable of analyzing each of the one or more distinct connected components of the filtered network for the presence of additional structure within the one or more distinct connected components and when the presence of additional structures is determined, decomposing the additional structures additional distinct connected components may be used.

The memory 240 may also include tree traversal logic 250. Tree traversal logic 250 may include instructions for performing a tree traversal of each decomposed connected component. Tree traversal is a form of graph traversal which refers to the process of visiting (i.e., checking and/or updating) each node in a tree data structure, such as a hierarchical structure or other tree representation of a network, exactly once. Such traversals are classified by the order in which the nodes are visited. There are generally three ways to traverse nodes of a network: in depth-first order: in-order, pre-order and post-order. However, there are other tree traversal algorithms, which concentrate on analyzing the most promising moves, basing the expansion of the search tree on random sampling of the search space. The tree traversal logic 250 may also include logic for merging the resulting structures, for example, hierarchical structures. The hierarchical structures may be determined from preforming tree traversals for each of the distinct connected components. As described in detail herein, the resulting hierarchical structures may be merged to find the local modularity optimum. This provides a number of structural components that may be retrieved from within the network. For example, when using the modularity spectral decomposition method to analyze the one or more distinct connected components, the tree traversal process may start at the top of the resulting tree, where components are broken into subcomponents as appropriate as the process traverses down the tree. The process stops when there are no components or subcomponents left to split. Next, the process moves back up the resulting tree to determine where the optimum split is by the modularity parameter (e.g., which may be expressed through eigenvectors of a characteristics matrix for the network model). In other embodiments, for example, embodiments that utilize the Louvain Modularity method, the tree traversal method starts at the nodes and joins nodes together, working up the tree until an optimum of the modularity parameter is observed. The optimum of the modularity parameter may first determine small communities (i.e., small structural components) by operating on all the nodes, then each small community may be grouped into one node and the tree traversal process may be repeated until no modularity increase can occur.

Figure 3:
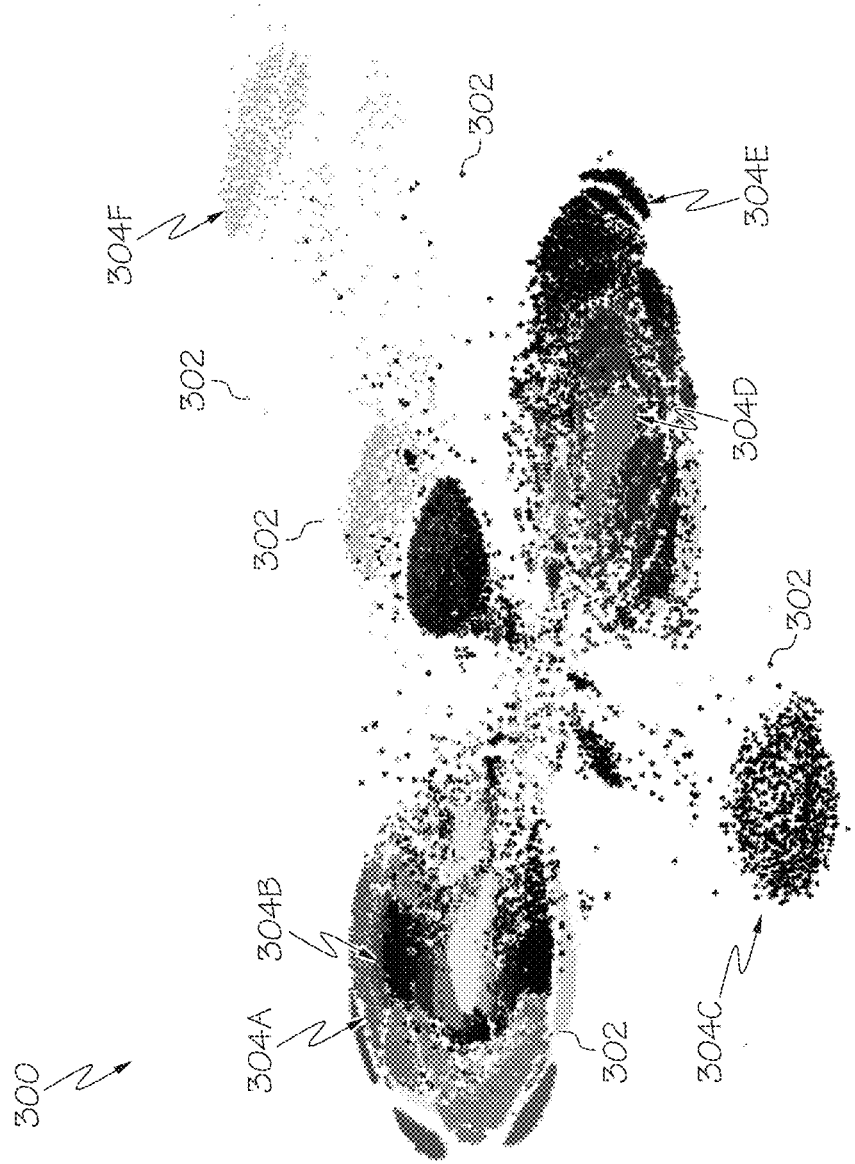
FIG. 3 graphically depicts a large and dense network having multiple underlying structures, according to one or more embodiments shown and described herein.

Referring now to FIG. 3, a graphical depiction of a large and dense network 300 is shown. Entities of the network 300 are illustrated by nodes 302, and relationships between the nodes are represented by edges. It is noted that the edges of the network 300 are not illustrated in FIG. 3 for ease of illustration. It should be understood that there might be underlying structure within the network 300 that may not be visible due to the size, density, and amount of noise within the network 300. For purposes of illustration and explanation, structures (e.g., structural components 304A-304E) of entities showing the underlying structure of the overall network 300 are depicted in differing grayscale values. Methods of uncovering the underlying structure include creating a representation of the network, (e.g., the representation depicted in FIG. 3), and then identifying structure using the methods described herein.

As mentioned above, with reference to FIG. 4, illustrative representations of networks and graphical representations of methods for determining the underlying structures are depicted. The representation of the network may be, without limitation, an edge list, an adjacency matrix, an adjacency list, or the like. As described in more detail herein, an edge list of a network model defines through a list of individual connections between two nodes. An adjacency matrix is a matrix whose rows and columns are indexed by nodes and whose cells contain a Boolean value that indicates whether an edge is present between the nodes corresponding to the row and column of the cell. An adjacency list of a network model associates each node in the network model with the collection of its neighboring nodes or edges. There are many variations of this basic idea, differing in the details of how they implement the association between nodes and collections, in how they implement the collections, in whether they include both nodes and edges or only nodes as first class objects, and in what kinds of objects are used to represent the nodes and edges.

Figure 4B:
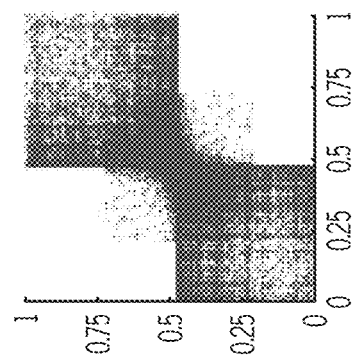
FIG. 4B depicts an illustrative representations of graph of results from a function fitting method applied to a network model for determining the underlying structures, according to one or more embodiments shown and described herein.
Figure 4A:
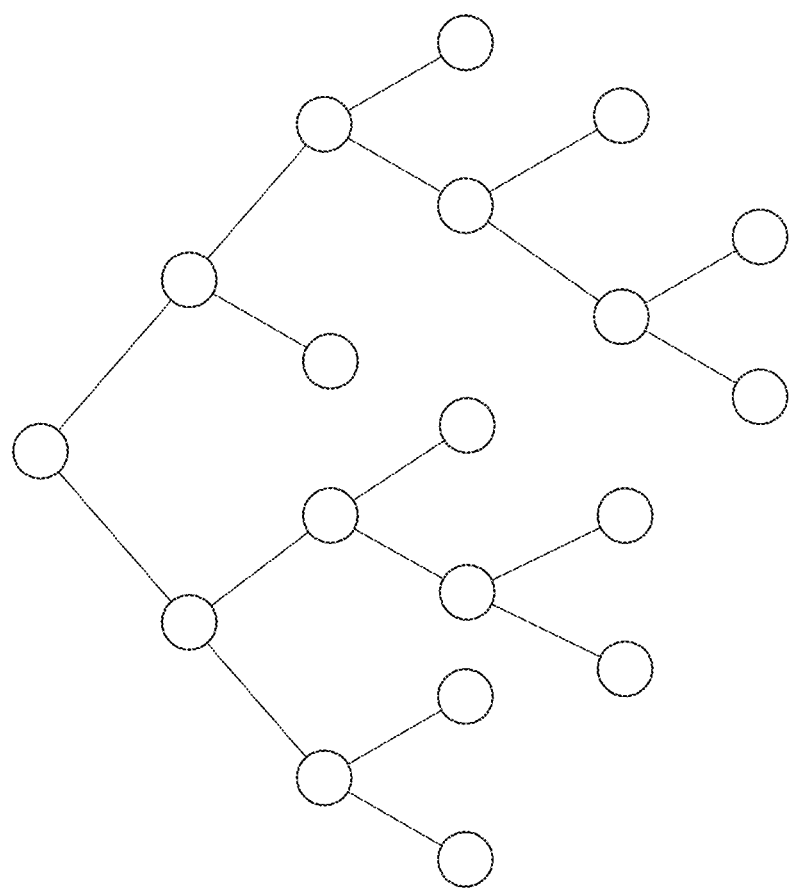
FIG. 4A depicts an illustrative representation of a hierarchal structure of a portion of a network model for determining the underlying structures, according to one or more embodiments shown and described herein.

With respect to the methods utilized for determining the underlying structure in the network, methods, for example, without limitation, Dijkstra's algorithm, spectral modularity decomposition methods, hierarchical structuring methods (e.g., as shown by the tree structure depicted in FIG. 4A), function fitting (e.g., shown by the graph of results from a function fitting method applied to a network model depicted in FIG. 4B) may be utilized in conjunction with filtering through an iterative process. That is, these methods alone are insufficient in accurately uncovering (e.g., distinguishing between signal and noise edges) within the network to determine the underlying structure, but when used together as described herein, can be used to determine underlying structures that define communicates of nodes sharing similar types of relationships.

Figure 5:
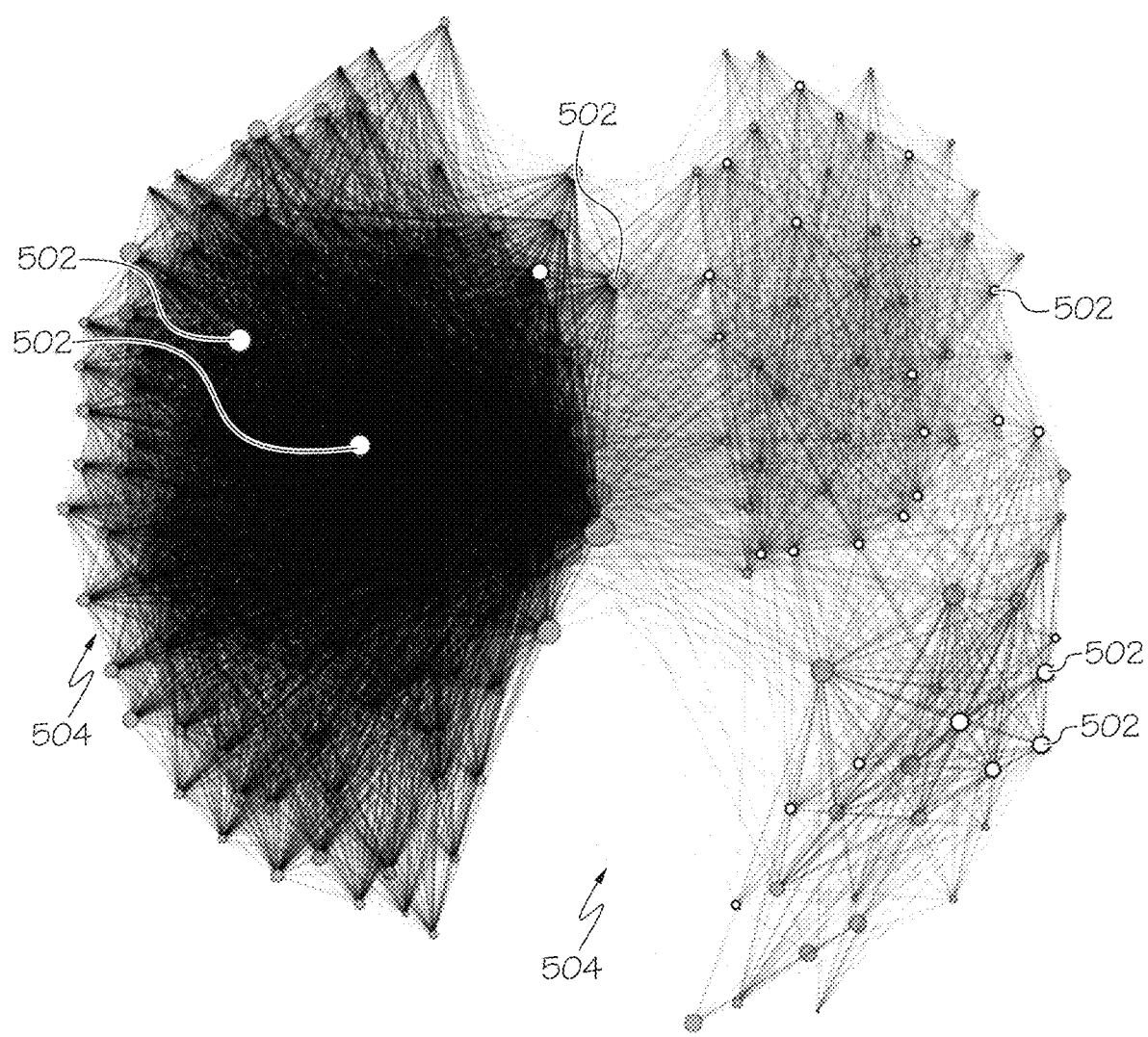
FIG. 5 depicts an illustrative a large, dense, and noisy network, according to one or more embodiments shown and described herein.

As referred to herein, "noise" is defined as edges that do not contribute greatly to the underlying structure. Referring to FIG. 5, an illustrative a large, dense, and noisy network model is depicted. The network includes a plurality of nodes 502 interconnected by edges 504 defining the relationships between the connected nodes. Noise is generally caused by random edges. In reality, random edges occur due to chance interactions between nodes (e.g., a common co-author, for example, a graduate student working under different professors, to a publication where one publication relates to applied mathematics and the other publication relates to electrical engineering) that do not go onto produce a long-term cluster of activity, but form dense components of the graph. The edges are therefore not indicative of structure, and the presence of these edges can mask this structure. It should be noted that networks are time varying and the structure may evolve. Thus, a noisy edge at a point in time may become increasingly central over time, through the creation of additional edges 504, and at some point in the future become indicative of structure. In the example of FIG. 5, a uniformly random connection model is defined by a probability that a node of the network connects a community i to a community j; $P_{ij}$. A community may be referred to as a cluster of related nodes or a structural component. For the uniformly random connection model, limitation of detectability with the modularity spectral decomposition method can be mathematically proven to be given by $p_{ii}-p_{ij}>2\sqrt{p}$. Empirical evidence demonstrates that all methods have a detection limitation. To detect structure in the network, one needs to minimize $P_{ij}$; the probability of a connection between nodes of different communities and maximize $P_{ii}$; the probability of a connection between nodes of the same community. However, because the difference between noise and signal cannot be determined, it is difficult to discriminate between within-community and cross-community edges and therefore it is challenging to both minimize $P_{ij}$ and maximize $P_{ii}$ simultaneously to uncover the underlying structure. It should be understood that embodiments of the present disclosure are not limited to determining structure within uniformly random connected graphs, and such graphs are merely provided as an example. The iterative approaches described herein may be applied to any type of graph.

Figure 6:
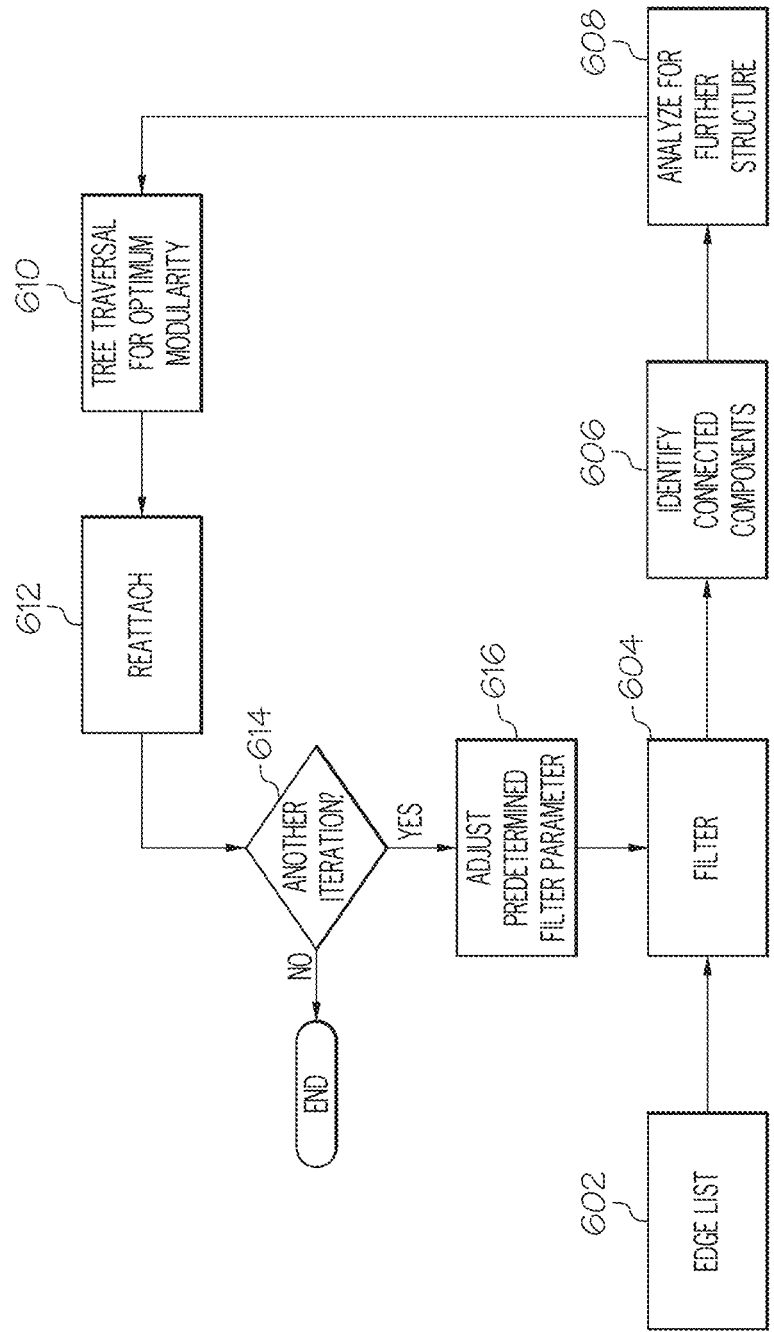
FIG. 6 graphically depicts a flow chart of an example method of iteratively extracting structure from a large, dense, and noisy network, according to one or more embodiments shown and described herein.
Figure 7:
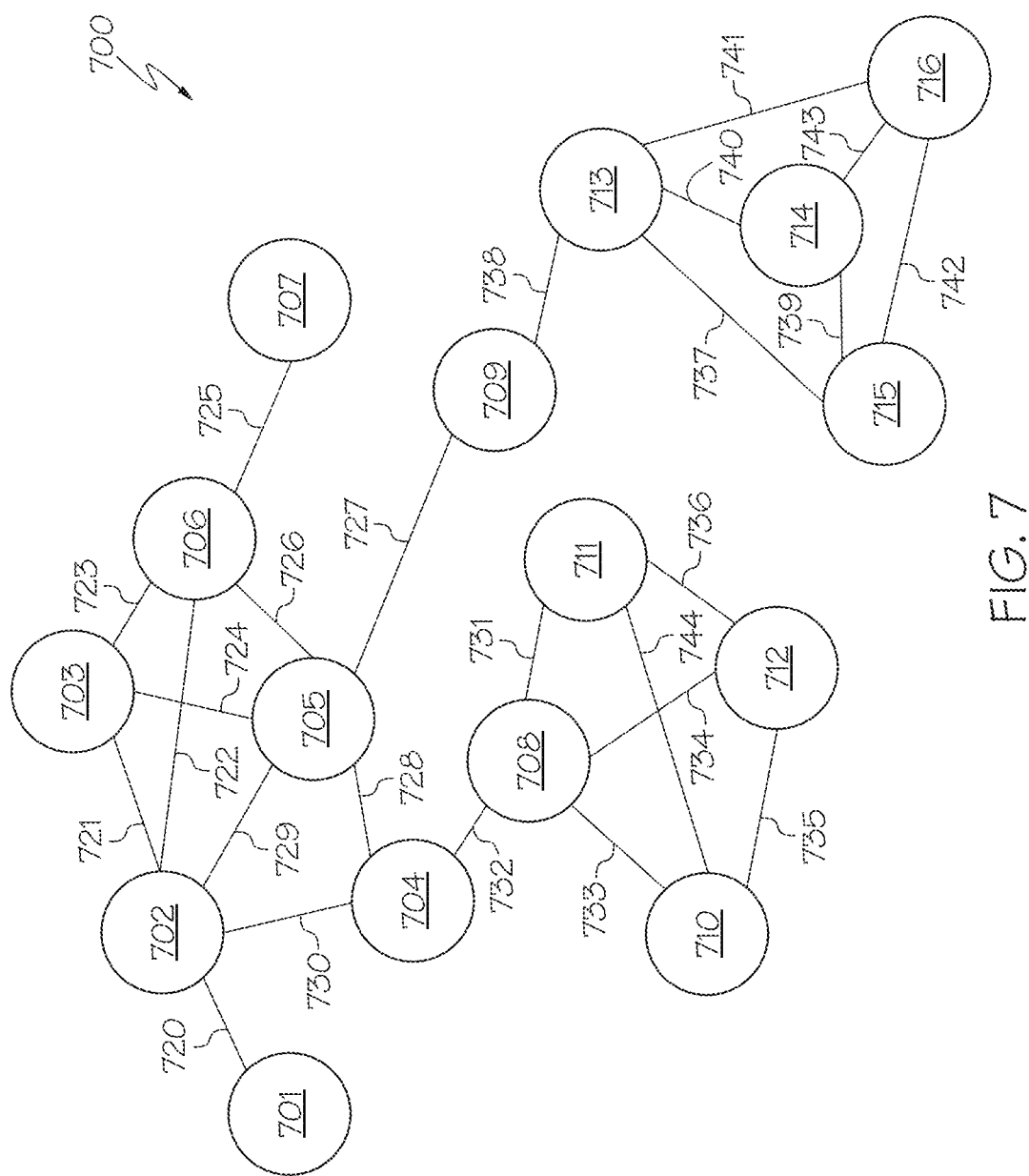
FIG. 7 illustratively depicts an illustrative network from which structure may be determined using the methods described herein, according to one or more embodiments shown and described herein.

Referring now to FIGS. 6 and 7, the methods for extracting structure from a large, dense, and noisy network model 700 utilizing a combination of filtering and analysis methods employed in an iterative process will now be described. FIG. 6 depicts a flow chart of an example method of iteratively extracting structure from a large, dense, and noisy network model 700. FIG. 7 illustratively depicts a network 700 from which structure may be determined using the methods described with respect to FIG. 6, herein. Although FIG. 7 provides a rather simple example network 700, this is merely for explanation purposes and it should be understood that the systems and methods described herein may be implemented on networks having hundred, thousands, millions, billions, or more nodes and edges. The network 700 depicted in FIG. 7 includes nodes 701-716 interconnected by edges 720-744. The edges 720-744 may each include a length. The length may define the strength of the relationship between connected nodes 720-744. In some embodiments, the length of the edge is inversely proportional to the strength of the relationship between connected nodes 720-744. For example, a long edge length may indicate a weak relationship whereas a short edge length may indicate a strong relationship between the connected nodes. Additionally, as described above each node may be defined by a node degree, which refers to the number of edges connected to the particular node. For example, node 701 has a node degree of 1 and node 702 has a node degree of 5. A strong or weak relationship (e.g., the degree or strength of the relationship) between nodes may be a result of the number of attributes the nodes share, for example, two publications may be linked together because they share a common co-author. A stronger link may be defined if the two publications also share similar or related subject matter or the like. However, this is only one limited example. Nodes of a network may also represent individual consumers and avenues of commerce (e.g., physical stores, online retail, tele-commerce or the like), where consumers are linked to avenues of commerce and other consumers through sets of habits such as buying frequency, return frequency, repeat purchase frequency and the like. The degrees of the attributes or habits may be normalized with others within the model when generating an initial network model of a consumer and avenue of purchase network model.

Referring now to FIGS. 6 and 7 with respect to a discussion of the methods for extracting structure from a large, dense, and noisy network model 700, at block 602, the system may receive an edge list. The edge list represents the entire network model. The edge list defines a network model 700 including a plurality of nodes and one or more edges connecting one or more nodes of the plurality of nodes to each other, where the one or more edges define a strength of a relationship between connected nodes. For example, an edge list for network model 700 is depicted in Table 1 below.

TABLE 1

| Edge | Node 1 | Node 2 | Weight/Length |
|---|---|---|---|
| 720 | 701 | 702 | 14 |
| 721 | 702 | 703 | 18 |
| 722 | 702 | 706 | 37 |
| 723 | 703 | 706 | 10 |
| 724 | 703 | 705 | 15 |
| 725 | 706 | 707 | 19 |
| 726 | 706 | 705 | 14 |
| 727 | 705 | 709 | 34 |
| 728 | 705 | 704 | 12 |
| 729 | 702 | 705 | 19 |
| 730 | 702 | 704 | 17 |
| 731 | 708 | 711 | 13 |
| 732 | 704 | 708 | 8 |
| 733 | 708 | 710 | 16 |
| 734 | 708 | 712 | 20 |
| 735 | 710 | 712 | 21 |
| 736 | 711 | 712 | 19 |
| 737 | 713 | 715 | 32 |
| 738 | 709 | 713 | 15 |
| 739 | 714 | 715 | 11 |
| 740 | 713 | 714 | 10 |
| 741 | 713 | 716 | 31 |
| 742 | 715 | 716 | 27 |
| 743 | 716 | 714 | 9 |
| 744 | 710 | 711 | 37 |

In some embodiments, the edge list may include only a matrix of nodes, while in other embodiments, an edge identifier and/or edge weight may be provided. Furthermore, an edge list is only one example of a representation for defining and inputting a network model. Other example representations that may be receive and utilized by the extraction computer or other computing system may include an adjacency matrix, adjacency list, or the like.

At block 604, a filtering method is employed to filter one or more nodes from the edge list based on a predetermined filter parameter, thereby forming a filtered network. The predetermined filter parameter may be a node degree value which, when applied by the filtering process, filters any nodes and related edges that have a node degree equal to or less than the predetermined filter parameter. For example, if the predetermined filter parameter is set to a value of two (2), then nodes 701, 707, and 709 would be filtered out of the network because nodes 701, 707, and 709 have two (2) or fewer connecting edges to other nodes. As a result, of the filtering process at least two distinct structures become apparent. As a result of the removal of node 709, the cluster of nodes including nodes 713-716 is separate from the remaining nodes, providing an initial indication that the cluster may be indicative of an underlying structure. In this non-limiting example, nodes that are not well-connected are filtered out of the network model 700. For example, nodes having less than a predetermined number of connections (e.g., having 2 or fewer connections as a non-limiting example) are filtered out of the network. The extent of the degree filter may be kept to a minimum in the first iteration. Removing nodes in this way decreases both nodes and edges indicative of structure and noise. However, given that nodes are more likely to have within-community connections than cross-community connections under the presence of structure, then a uniform removal of nodes will decrease the cross community edges ($P_{ij}$) more than the within community edges ($P_{ii}$). As a result, the ability to define the structure in the network may be enhanced.

As mentioned above, there are distinct connected components within the network that remain after the filtering step, at block 604. At block 606, distinct connected components are found. As one non-limiting example, Dijkstra's algorithm may be used to identify the connected components. Dijkstra's algorithm may generate a plurality of distinct connected components defining the shortest-path between a first node and a second node within the network. For a given node, Dijkstra's algorithm may determine the shortest-path to the numerous other node for which the given node is connected to and output connected components defining these paths. For example, connected components for node 702 may be defined by way of the following listing of nodes in Table 2 below.

TABLE 2

702 → 703 → 706
702 → 705
702 → 704 → 708 → 710
702 → 704 → 708 → 711
702 → 704 → 708 → 712

These listings represent the shortest path to a number of end nodes within the filtered network after nodes 701, 707 and 709 are removed as a result of the filtering process described herein. This may be repeated for each of the other nodes within the network such that distinct connected components are identified.

For each connected component determined in block 606, the processes at blocks 608 and 610 are applied. At block 608, the connected components found in block 606 are analyzed and further structure is found. That is, each of the one or more distinct connected components of the filtered network is analyzed for the presence of additional structure within the one or more distinct connected components, such that when the presence of additional structures is determined the additional structures are decomposed into additional distinct connected components. In some embodiments, the goal of the step described at block 608 is to determine divisions within the nodes such that the nodes are separated into two or more groups while minimizing the number of edges running between the groups. One approach is referred to as "minimum cut" approach. However, this approach may define an optimal division where one group includes 0 or 1 node and the other group includes all the rest of the nodes. Therefore, a division of a network into communities may not be determined solely on which division has the fewest number of edges between communicates, but one in which there are fewer than expected edges between communities. In some embodiments, this approach may be quantified using the measure referred to as modularity.

The modularity is, up to a multiplicative constant, the number of edges falling within groups minus the expected number in an equivalent network with edges at random. The modularity may be either positive or negative, with positive values indicating the possible presence of a community structure. Therefore, the system can search for community structures by looking for the divisions of a network that have positive and large values of modularity. In some embodiments, to make the modularity process workable for large network problems, heuristic methods or external optimization may be used. However, as described herein, the modularity process may be reformulated in terms of the spectral properties of the network of interest. A non-limiting example method used to identify this structure includes the modularity spectral decomposition method. In other words, techniques are used to optimize the connected components for a parameter (e.g., modularity parameter). In some embodiments, the spectral decomposition methods, hierarchical methods or function fitting methods may be utilized at block 608. As a non-limiting example, suppose the network model contains n nodes. For a particular division of the network model into two groups let $s_i=1$ if node i belongs to group 1 and $s_i=-1$ if node I belongs to group 2. Let the number of edges between nodes i and j be $A_{ij}$, which will normally be 0 or 1, although larger values are possible in networks where multiple edges are allowed. (The quantities $A_{ij}$ are the elements of the so-called adjacency matrix (i.e., which may be generated from an edge list or other matrix representation of the network model)). At the same time, the expected number of edges between nodes i and j if edges are placed at random is $k_i k_j/2m$, where $k_i$ and $k_j$ are the degrees of the nodes and $m=\frac{1}{2}\Sigma_i k_i$ is the total number of edges in the network model. Thus, the modularity Q is given by the sum of $$A_{ij} - \frac{k_i k_j}{2m}$$

over all pairs of nodes i, j that fall in the same group.

Observing that the quantity $\frac{1}{2}(s_i s_j+1)$ is 1 if i and j are in the same group and 0 otherwise, the modularity can be expressed as Equation 1:

$$Q = \frac{1}{4m}\sum_{ij}\left(A_{ij} - \frac{k_i k_j}{2m}\right)(s_i s_j + 1) = \frac{1}{4m}\sum_{ij}\left(A_{ij} - \frac{k_i k_j}{2m}\right)(s_i s_j) \qquad \text{Eq. 1}$$

where the second equality follows from the observation that $2m=\Sigma_{ij}A_{ij}$. The leading factor of ¼m is merely conventional. Equation 1 can therefore be written in matrix form as Equation 2.

$$Q = \frac{1}{4m}s^T Bs \qquad \text{Eq. 2}$$

where s is the column vector whose elements are the $s_i$ and a real symmetric matrix B has been defined with elements expressed in Equation 3.

$$B_{ij} = A_{ij} - \frac{k_i k_j}{2m} \qquad \text{Eq. 3}$$

which is called the modularity matrix. It is noted that the elements of each of the matrix rows and columns sum to zero, so that it always has an eigenvector (1, 1, 1, . . . ) with eigenvalue zero. Given Eq. 2, s may be written as a linear combination of the normalized eigenvectors $u_i$ of B so that $s=\Sigma_{i=1}^n a_i u_i$ with $a_i=u_i^T \cdot s$. Then Equation 4 may be found, which may be represented as follows:

$$Q = \frac{1}{4m}\sum_i a_i u_i^T B \sum_j a_j u_j = \frac{1}{4m}\sum_{i=1}^n (u_i^T \cdot s)^2 \beta_i \qquad \text{Eq. 4}$$

where $\beta_i$ is the eigenvalue of B corresponding to eigenvector $u_1$. Assume that the eigenvalues are labeled in decreasing order, $\beta_1 \geq \beta_2 \geq \ldots \beta_n$. The goal is to maximize modularity by choosing an appropriate division of the network model by equivalently choosing the value of the index vector s. This means choosing s so as to concentrate as much weight as possible in terms of the sum in Eq. 4 involving the largest (i.e., most positive) eigenvalues. If there were no other constraints on the choice of s (apart from normalization), then s could be chosen to be proportional to the eigenvector $u_1$. This places all the weight in the term involving the largest eigenvalue $\beta_1$, the other terms being automatically zero, because the eignvectors are orthogonal.

However, there is another constraint on the problem imposed by the restriction of the elements of s to the values ±1, which means s may not normally be chosen parallel to $u_i$. However, it can be made as parallel as possible by maximizing the dot product $u_i^T \cdot s$. The maximum is achieved by setting $s_i=+1$ if the corresponding element of $u_i$ is positive and $s_i=-1$ otherwise. In other words, all nodes whose corresponding elements are positive go in one group and all of the rest in the other. This then gives the algorithm for dividing the network. That is, the algorithm computes the leading eigenvector of the modularity matrix and divides the nodes into two groups according to the signs of the elements in this vector. The algorithm as described makes use only of the signs of the elements of the leading eigenvector, but the magnitudes also convey information. Nodes corresponding to elements of large magnitude make large contributions to the modularity (e.g., as shown by Eq. 4) and conversely for small ones. Alternatively, if we take the optimal division of a network into two groups and move a node from one group to the other, the vector element for that node gives an indication of how much the modularity will decrease: nodes corresponding to elements of large magnitude cannot be moved without incurring a large modularity penalty, whereas those corresponding to smaller elements can be moved at relatively little cost. Thus, the elements of the leading eigenvector measure how firmly each node belongs to its assigned community, those with large vector elements being strong central members of their communities, whereas those with smaller elements are more ambivalent.

In some embodiments, additional structures may be decomposed in to additional distinct connected components, at block 608. For example, the spectral modularity decomposition method described hereinabove may determine that a division based on the eigenvector may be made across the edge 732, thereby forming another cluster (i.e., distinct connected components). For example, without limitation, the spectral modularity decomposition method forms at least three distinct connected components: group 1 having nodes 702, 703, 704, 705, 706; group 2 having nodes 708, 710, 711, 712; and group 3 having 713, 714, 715, and 716, at block 608.

Still referring to FIGS. 6 and 7, the system may perform a tree traversal of each of the distinct connected components wherein the resulting hierarchical structure from the tree traversal is merged to determine a local modularity optimum, at block 610. That is, local modularity optimum may define the local cluster connections within an identified structure that is less than the overall global network model. For example, a network model of publications may have one or more connected components (e.g., structures) that each include particular subject matter, while within each of the one or more connected components additional structures may be present based more specifically on relationships between authorship, sub-topics, or the like. The local modularity optimum may define the divisions between the local clusters (e.g., sub-communities) of these additional structures. As described above, performing the tree traversal may include traversing each decomposed connected component. That is, tree traversal is a form of graph traversal which refers to the process of visiting (i.e., checking and/or updating) each node in a tree data structure, such as a hierarchical structure or other tree representation of a network, exactly once. The resulting hierarchical structure is merged to find the local modularity optimum. This provides a number of structural components retrieved from within the network. In the example provided above, which uses the modularity spectral decomposition method, the process starts at the top of the tree, where components are broken into subcomponents as appropriate as the process traverses down the tree. The process stops when there are no components/subcomponents left to split. Next, the process moves back up the resulting tree to see where the optimum split is by the modularity parameter. In response to determining the local modularity optimum, one or more structural components may be generated from the network.

After generating one or more structural components at block 610, the nodes, which were removed from by the filtering at block 604, may be reattached, at block 612. More specifically, a filtered node of the one or more nodes that were filtered based on the predetermined filter parameter may be reattached based on a voting process. The voting process may include determining which community (e.g., structural component) the node should be reattached to. For example, if a filtered out node originally had three connections to community A, and two connections to community B, then the particular node may be attached to community A because it had more connections to community A. In some embodiments, the length of the edge connecting the node to the community may be considered. For example, if a filtered out node originally have one connection to community C and one connection to community D, but the connection to community D was defined by an edge having a longer line length than the edge connecting the filtered node to community C, then the filtered node may be reconnected to community C. As such, a filtered node may not necessarily be reattached in the same location from which it was removed.

After the completion of an iteration (blocks 604-612), it may be determined, at block 614, whether or not to filter again and complete another iteration or stop the process. The determination may be based on the conductance of the communities defined by the one or more structural components generated by one or more iterations of the method. To determine conductance of the communities, for example, the following process may be utilized. Assuming G=(V, E) denotes a graph of a network, then the conductance φ of a set of nodes S ⊂ V, (where S is assumed to contain no more than have of all the nodes), is defined as follow. Let v be the sum of degrees of nodes in S, and let s be the number of edges with one endpoint in S and one endpoint in $\overline{S}$, where $\overline{S}$ denotes the complement of S. Then, the conductance of S is φ=s/v, or equivalently φ=s/(s+2e), where e is the number of edges with both endpoints S. More formally, if A is the adjacency matrix of the graph G, then:

$$\phi(S) = \frac{\sum_{i \in S, j \notin S} A_{ij}}{\min\{A(S), A(\overline{S})\}} \qquad \text{Eq. 6}$$

where $A(S)=\Sigma_{i \in S}\Sigma_{j \in V}A_{ij}$, in which case the conductance of the graph G is $$\phi_G = \min_{S \subset V} \phi(S) \qquad \text{Eq. 7}$$

Thus, the conductance of a set provides a measure for the quality of the cut (S, $\overline{S}$), or relatedness of a community S. Indeed, it is often noted that communities should be thought of as sets of nodes with more and/or better intra-connections than inter-connections. When interested in detecting communities and evaluating their quality, small conductances may be preferred (i.e., sets that are densely linked inside a community and sparsely linked to outside communities).

If it is decided to filter again and perform another iteration, the predetermined filter parameter, may be increased to remove more elements that contribute to the noise in the network during subsequent iterations, at block 616, before returning to block 604 to perform a subsequent filtering process. In some embodiments, the predetermined filter parameter may be decreased to allow for more nodes, for example, in the event too many were excluded during the first iteration.

Regardless of whether additional iterations of the method are performed to extract structure from large, dense, and noisy network models, the resulting communicates, which are also referred to herein as structural components within the network may be stored as reattached networks within the data storage component. These communities may be utilized by other applications and methods for analyzing data, in particular, big data sets to determine relationships, trends, or the like from the data. In some embodiments, the data sets that form the networks are based on many variables and many relationships, which would not be feasibly analyzed by through parsing an entire network. However, by extracting structures from the large and dense networks of information, the data may become more manageable for computing resources and provide more efficient analysis results.

It should also be understood that the systems and methods shown and described herein extract structure from large, dense, noisy network models through an iterative process. The process generally includes receiving an edge list that defines a network including a plurality of nodes and one or more edges connecting one or more nodes of the plurality of nodes to each other. The method further includes filtering out one or more nodes from the edge list based on a predetermined filter parameter, thereby forming a filtered network, identifying one or more distinct connected components within the filtered network utilizing Dijkstra's algorithm, and analyzing each of the one or more distinct connected components of the filtered network for the presence of additional structure within the one or more distinct connected components, such that when the presence of additional structures is determined the additional structures are decomposed into additional distinct connected components. Additionally, a tree traversal may be performed on each of the distinct connected components and the resulting hierarchical structure from the tree traversal is merged to determine a local modularity optimum. In response to the local modularity optimum determined from the tree traversal process, one or more structural components within the network may be generated.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for extracting structure from networks, the method comprising:
receiving, by a processor, an edge list, wherein the edge list defines a network including a plurality of nodes and one or more edges connecting one or more nodes of the plurality of nodes to each other, wherein the one or more edges define a strength of a relationship between connected nodes;
filtering out, by the processor, one or more nodes from the edge list based on a predetermined filter parameter, thereby forming a filtered network;
identifying one or more distinct connected components within the filtered network utilizing Dijkstra's algorithm;
analyzing each of the one or more distinct connected components of the filtered network for the presence of additional structures within the one or more distinct connected components, wherein the additional structures are decomposed into additional distinct connected components;
performing a tree traversal of each of the distinct connected components, wherein a resulting hierarchical structure from the tree traversal is merged to determine a local modularity optimum;
generating, in response to the local modularity optimum, one or more structural components within the network; and
reattaching a filtered node of the one or more nodes filtered based on the predetermined filter parameter after performing the tree traversal, wherein reattaching the filtered node is based on a voting process, and wherein the filtered node is reattached to a structural component of the one or more structural components based the strength of the relationship between the filtered node and the one or more nodes of the one or more structural components.

2. The method of claim 1, further comprising:
determining whether or not to filter the network based on a second predetermined filter parameter; and
complete another iteration of the method based on a conductance between nodes of the one or more structural components within the network.

3. The method of claim 2, wherein the predetermined filter parameter in a first iteration includes a first predefined number of connections that is less than a second predetermined number of connections in a second iteration.

4. The method of claim 1, wherein a length of each of the one or more edges is inversely proportional to the strength of the relationship between connected nodes.

5. The method of claim 1, wherein analyzing each one of the one or more distinct connected components utilizes a modularity spectral decomposition method.

6. The method of claim 1, wherein the predetermined filter parameter is a predetermined value defining a number of edges connected to a node.

7. A system for extracting structure from networks comprising:
a processor; and
a non-transitory, processor-readable memory coupled to the processor, the non-transitory, processor-readable memory comprising a machine readable instruction set stored thereon that, when executed by the processor, causes the processor to:
receive an edge list, wherein the edge list defines a network including a plurality of nodes and one or more edges connecting one or more nodes of the plurality of nodes to each other, wherein the one or more edges define a strength of a relationship between connected nodes;
filter out one or more nodes from the edge list based on a predetermined filter parameter, thereby forming a filtered network;

identify one or more distinct connected components within the filtered network utilizing Dijkstra's algorithm;

analyze each of the one or more distinct connected components of the filtered network for the presence of additional structures within the one or more distinct connected components, wherein the additional structures are decomposed into additional distinct connected components;

perform a tree traversal of each of the distinct connected components, wherein a resulting hierarchical structure from the tree traversal is merged to determine a local modularity optimum;

generate, in response to the local modularity optimum, one or more structural components within the network; and reattach a filtered node of the one or more nodes filtered based on the predetermined filter parameter after performing the tree traversal, wherein reattaching the filtered node is based on a voting process, and wherein the filtered node is reattached to a structural component of the one or more structural components based the strength of the relationship between the filtered node and the one or more nodes of the one or more structural components.

8. The system of claim 7, wherein the machine readable instruction set, when executed, further causes the processor to:

determine whether or not to filter the network based on a second predetermined filter parameter; and complete another iteration of the method based on a conductance between nodes of the one or more structural components within the network.

9. The system of claim 8, wherein the predetermined filter parameter in a first iteration includes a first predefined number of connections that is less than a second predetermined number of connections in a second iteration.

10. The system of claim 7, wherein each of the one or more edges includes a value that defines the strength of the relationship between connected nodes.

11. The system of claim 7, wherein analyzing each one of the one or more distinct connected components utilizes a modularity spectral decomposition method.

12. The system of claim 7, wherein the predetermined filter parameter is a predetermined value defining a number of edges connected to a node.

13. The system of claim 7, wherein a first edge of the one or more edges includes a first length and a second edge of the one or more edges includes a second length that is longer than the first length of the first edge defines a weaker relationship than the first length having a shorter length than the second edge.

14. A non-transitory computer program product for extracting structure from networks, the computer program product comprising instructions, which when executed by a computer, cause the computer to carry out steps comprising:

receiving an edge list, wherein the edge list defines a network including a plurality of nodes and one or more edges connecting one or more nodes of the plurality of nodes to each other, wherein the one or more edges define a strength of a relationship between connected nodes;

filtering out one or more nodes from the edge list based on a predetermined filter parameter, thereby forming a filtered network;

identifying one or more distinct connected components within the filtered network utilizing Dijkstra's algorithm;

analyzing each of the one or more distinct connected components of the filtered network for the presence of additional structures within the one or more distinct connected components, wherein the additional structures are decomposed into additional distinct connected components;

performing a tree traversal of each of the distinct connected components wherein a resulting hierarchical structure from the tree traversal is merged to determine a local modularity optimum;

generating, in response to the local modularity optimum, one or more structural components within the network; and reattaching a filtered node of the one or more nodes filtered based on the predetermined filter parameter after performing the tree traversal, wherein reattaching the filtered node is based on a voting process, and wherein the filtered node is reattached to a structural component of the one or more structural components based the strength of the relationship between the filtered node and the one or more nodes of the one or more structural components.

15. The computer program of claim 14, further comprising:

determining whether or not to filter the network based on a second predetermined filter parameter; and complete another iteration of the method based on a conductance between nodes of the one or more structural components within the network.

16. The computer program of claim 15, wherein the predetermined filter parameter in a first iteration includes a first predefined number of connections that is less than a second predetermined number of connections in a second iteration.

17. The computer program of claim 14, wherein the analyzing step utilizes a modularity spectral decomposition method.

* * * * *